Feb. 8, 1949.  L. A. LAMB  2,460,833
HOSE COUPLING
Filed Feb. 28, 1946

INVENTOR.
LUCY A. LAMB
BY
Hyde, Meyer, Baldwin & Doran
ATTORNEYS

Patented Feb. 8, 1949

2,460,833

UNITED STATES PATENT OFFICE 2,460,833

HOSE COUPLING

Lucy A. Lamb, Cleveland Heights, Ohio

Application February 28, 1946, Serial No. 650,838

4 Claims. (Cl. 285—171)

The invention relates to novel and improved coupling devices for connecting the free ends of tubular fluid conductors. It is particularly adapted to improvements in couplers for connecting sections of garden hose in leak-proof relationship.

An object of the invention is to provide a novel and improved coupler of the character indicated which is simple and sturdy in construction and which can be readily applied and manipulated.

Another object of the invention is to provide a novel and improved coupler which is leak-proof, and which will maintain its operative position regardless of strains and shocks.

Another object of the invention is to provide a coupler of the character indicated, and which has novel and improved means for effecting attachment or permitting separation of the complementary coupler parts.

Other objects and advantages will be apparent from a study of the following specification, in conjunction with the accompanying drawings, in which.

Figure 1:
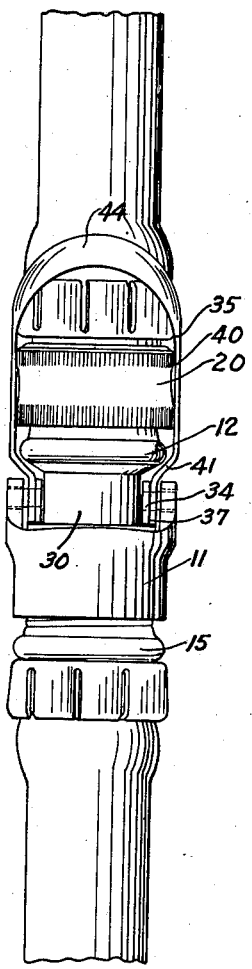
Fig. 1 is a side elevational view of a hose coupler constructed in accordance with the present invention, attached hose portions being shown only in part.
Figure 2:
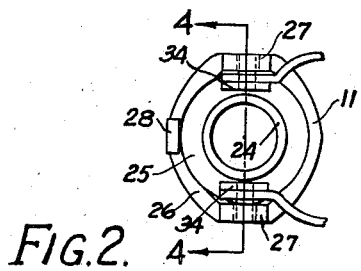
Fig. 2 is a top plan view of one of the two complementary coupler parts.
Figure 3:
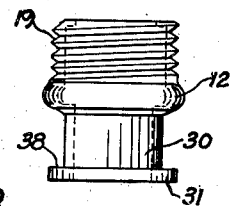
Fig. 3 is a side elevational view of the other complementary coupler part.

Before the present invention here illustrated is described in detail, it is to be understood that the invention here involved is not limited to the details of construction or the specific arrangement of parts herein illustrated or described, as the invention obviously may take various forms. It also is to be understood that the phraseology or terminology herein employed is for the purpose of description and not of limitation, the scope of the present invention being defined in the appended claims.

Speaking first generally, the coupler comprises two complementary members, namely, a socket member 11 and a plug member 12 which are retained in operative, leak-proof relationship by the interfitting connection of certain of their parts, and by the gripping effect of a novel clamping yoke, all of which will now be discussed in detail.

The socket 11 comprises a hollow annular body having at one end an internally threaded annular flange 14 adapted to receive an externally threaded end portion 15 of a conventional garden hose or fluid outlet connection.

The plug 12 comprises a hollow annular body having an exterior thread 19 at one end for removably fixed association with the interior thread on a hose connector 20 on the end of a section of garden hose or other fluid conductor. It will of course be understood that the socket 11 may carry the exterior thread, and the plug 12 may carry the interior thread, their positions being interchangeable if convenient or desirable.

The plug and the socket are provided at their respective ends remote from the threaded ends as aforesaid with means, now to be described, whereby they may be removably attached to each other in fluid transmitting relationship, by a simple, lateral engaging movement until they are in axial alignment, whereupon a clamping yoke is operated to retain them in connected engagement.

Figure 4:
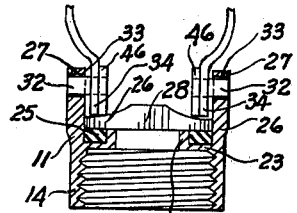
Fig. 4 is a sectional view taken on the line 4—4 of Fig. 2.

The end of socket 11 remote from the threaded portion is internally counter-bored to provide a transverse shoulder 23 (Figs. 4 and 5) having a central aperture, around the edge of which is an annular retaining flange 24 which maintains a sealing ring or washer 25 within the counter-bore. The annular outer wall 26 of the counter-bore carries a pair of diametrically opposed, longitudinally projecting lugs 27, and, on one side and between the lugs, a back stop 28, likewise projecting longitudinally from the outer counter-bore wall 26.

The end of plug 12 remote from the threaded portion 19 is provided with a diametrically reduced neck portion 30 having at its free end remote from the thread 19 an outwardly extending flange 31 the exterior diameter of which is sufficiently reduced to permit it to slide laterally between lugs 27 and against back stop 28. When in this position the fluid apertures in socket 11 and plug 12 are coaxial, and flange 31 rests on sealing washer 25.

Lugs 27 are provided with a pair of diametrically aligned apertures 33. Rotatably carried adjacent the inner opposed faces of lugs 27, and having pivot portions 32 journaled in apertures 33, are a pair of cams 34 carried on the respectively opposed ends of a bifurcated clamping yoke 35. If desired, of course, the apertures may be in the cams and the pivot portions may be affixed to the lugs, the structure being more specifically described hereinafter.

When the plug member 12 has been placed in position as aforesaid with its flange 31 between lugs 27 and against stop 28, and with its transverse outer annular face 36 in loose contact with washer 25, the cams 34 lie within the annular space surrounding the neck 30. It will be apparent, therefore, that rotation of cams 34 will bring the raised portions 37 of the cams into contact with the transverse annular face 38 of flange 31 so as to bind said flange tightly against the sealing washer and permit passage of fluid under pressure, through the aligned plug and socket bores.

Both of the cams 34 are simultaneously moved into and out of contact with flange 31 by the aforesaid generally U-shaped clamping yoke 35. The ends of the generally parallel legs 40 of the yoke have an inward offset 41 terminating in the aforesaid cams 34. This permits the legs 40 to lie outwardly along hose connector 20 (Fig. 1) while the leg ends and cams lie within lugs 27.

Figure 5:
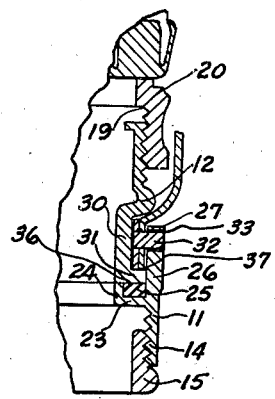
Fig. 5 is a fragmentary sectional view, somewhat enlarged, showing the coupler parts in assembled relationship.
Figure 6:
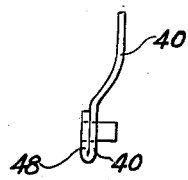
Fig. 6 is a plan view of a fragmentary portion of a slightly modified clamping yoke.

In the embodiment of the clamping yoke shown in the drawings, each cam portion is reinforced by welding or otherwise attaching to a lateral face thereof an additional metal member 46 in lapped relationship with the cam, as best seen for example in Fig. 5. In the embodiment of the invention shown in Fig. 6, the reinforcement of the cam tip is effected by reversely bending the extreme ends of the yoke legs 40 to produce an overlapping fold 48.

Outwardly extending from each of the cams 34 is the pivot pin 32 which is journaled in aperture 33 of the lug. The yoke is preferably constructed of strip metal of spring-like characteristics, the legs being biased outwardly so as to maintain pivot pins 32 in the lug apertures 33. The yoke may be removed by compression on the outer leg surfaces to clear the pins from the apertures.

It will be obvious that hose sections provided with plugs and sockets as hereinabove described may be united in not more than a second or two, with no troublesome screwing operations to be performed which would entail necessary matching of screw threads, perhaps in locations somewhat difficult to conveniently reach. The cam operating lever is long enough to provide sufficient binding force, yet in working position it lies so snugly against the hose or fluid outlet that it is not likely to be accidentally dislodged. It will be understood from an examination of the drawings that the U-shaped lever is angularly disposed to the cam portions in such manner that when the couplings are held in tight contact the lever arm lies along the hose as previously described.

What I claim is:

1. A hose connector comprising a pair of complementary coupling members, each such member having an axial bore, said members being adapted to be placed in interfitting arrangement so that their respective bores are aligned in fluid transmitting relationship, one said member having affixed thereto a pair of opposed lugs the other said member having a transverse shoulder disposable between said lugs when the parts are in said interfitting arrangement, a clamping yoke of U-shaped contour carried by said lugs, said yoke being provided with a pair of generally parallel legs each having, near its extremity, a pivotal connection with a respective lug, the tip end of each said leg having a cam portion engageable with said transverse shoulder whereby rotation of said cams by pivotal movement of said yoke presses the two said members into mutually tight fitting engagement, each said leg member having an inward offset near its free end to place the portion beyond the offset within and between said lugs, and on the opposite side of said pivotal connection from said cam portions.

2. A hose connector comprising a pair of complementary coupling members, each such member having an axial bore, said members being adapted to be placed in interfitting arrangement so that their respective bores are aligned in fluid transmitting relationship, one said member having affixed thereto a pair of opposed lugs the other said member having a transverse shoulder disposable between said lugs when the parts are in said interfitting arrangement, a clamping yoke of U-shaped contour carried by said lugs, said yoke being provided with a pair of generally parallel legs each having, near its extremity, a pivotal connection with a respective lug, the tip end of each said leg having a cam portion engageable with said transverse shoulder whereby rotation of said cams by pivotal movement of said yoke presses the two said members into mutually tight fitting engagement, each said leg member having an inward offset near its free end to place the portion beyond the offset within and between said lugs, and on the opposite side of said pivotal connection from said cam portions, each said cam portion being provided with reinforcing means consisting of an additional metal member in lapped relationship with a lateral face thereof.

3. A hose connector comprising a pair of complementary coupling members, each such member having an axial bore, said members being adapted to be placed in interfitting arrangement so that their respective bores are aligned in fluid transmitting relationship, one said member having affixed thereto a pair of opposed lugs the other said member having a transverse shoulder disposable between said lugs when the parts are in said interfitting arrangement, a clamping yoke of U-shaped contour carried by said lugs, said yoke being provided with a pair of generally parallel legs each having, near its extremity, a pivotal connection with a respective lug, the tip end of each said leg having a cam portion engageable with said transverse shoulder whereby rotation of said cams by pivotal movement of said yoke presses the two said members into mutually tight fitting engagement, each said leg member having an inward offset near its free end to place the portion beyond the offset within and between said lugs, and on the opposite side of said pivotal connection from said cam portions, each said cam portion being provided with reinforcing means consisting of an additional metal member in lapped relationship with a lateral face thereof, such metal member consisting of a reversely bent portion of the outer end of the leg.

4. A hose connector comprising a pair of complementary coupling members, each such member having an axial bore, said members being adapted to be placed in interfitting arrangement so that their respective bores are aligned in fluid transmitting relationship, one said member having affixed thereto a pair of opposed lugs the other said member having a transverse shoulder disposable between said lugs when the parts are in said interfitting arrangement, a clamping yoke of U-shaped contour carried by said lugs, said yoke being provided with a pair of generally parallel legs each having, near its extremity, a pivotal connection with a respective lug, the tip end of each said leg having a cam portion engageable with said transverse shoulder whereby rotation of said cams by pivotal movement of said yoke presses the two said members into mutually tight fitting engagement, each said leg member having an inward offset near its free end to place the portion beyond the offset within and between said lugs, and on the opposite side of said pivotal connection from said cam portions, said clamping yoke being formed of spring metal of springlike characteristics, the leg ends being biased outwardly to normally maintain the said pivotal relationship with the lugs.

LUCY A. LAMB.

REFERENCES CITED

The following references are of record in the file of this patent:

UNITED STATES PATENTS

| Number | Name | Date |
| --- | --- | --- |
| 228,196 | Hill | June 1, 1880 |
| 1,519,097 | Kraft | Dec. 9, 1924 |

FOREIGN PATENTS

| Number | Country | Date |
| --- | --- | --- |
| 848,738 | France | July 3, 1939 |